United States Patent [19]
Prasad et al.

[11] Patent Number: 5,976,223
[45] Date of Patent: Nov. 2, 1999

[54] SOLID ELECTROLYTE IONIC CONDUCTOR SYSTEMS FOR OXYGEN, NITROGEN, AND/OR CARBON DIOXIDE PRODUCTION WITH GAS TURBINE

[75] Inventors: Ravi Prasad, East Amherst; Christian Friedrich Gottzmann, Clarence, both of N.Y.

[73] Assignee: Praxair Technology, Inc., Danbury, Conn.

[21] Appl. No.: 08/972,409

[22] Filed: Nov. 18, 1997

[51] Int. Cl.⁶ .................................................. B01D 53/22
[52] U.S. Cl. ........................... 95/54; 95/96; 95/117; 95/288
[58] Field of Search ................... 95/39, 45, 52, 95/54, 96, 115, 117, 288

[56] References Cited

U.S. PATENT DOCUMENTS

| | | | |
|---|---|---|---|
| 3,731,495 | 5/1973 | Coveney | 62/39 |
| 4,545,787 | 10/1985 | Hegarty | 55/16 |
| 4,685,287 | 8/1987 | Takuma | 60/39.07 |
| 5,035,726 | 7/1991 | Chen et al. | 95/54 |
| 5,035,727 | 7/1991 | Chen | 55/16 |
| 5,160,713 | 11/1992 | Mazanec et al. | 95/54 X |
| 5,174,866 | 12/1992 | Chen et al. | 204/59 |
| 5,205,842 | 4/1993 | Prasad | 95/54 X |
| 5,245,110 | 9/1993 | Van Dijk et al. | 585/946 |
| 5,354,547 | 10/1994 | Rao et al. | 95/45 X |
| 5,435,836 | 7/1995 | Anand et al. | 95/45 |
| 5,447,555 | 9/1995 | Yee et al. | 95/54 |
| 5,459,994 | 10/1995 | Drnevich | 60/39.02 |
| 5,516,359 | 5/1996 | Kang et al. | 95/14 |
| 5,547,494 | 8/1996 | Prasad et al. | 95/54 |
| 5,562,754 | 10/1996 | Kang et al. | 95/54 |
| 5,565,017 | 10/1996 | Kang et al. | 95/14 |
| 5,584,194 | 12/1996 | Gardner | 95/54 X |
| 5,611,842 | 3/1997 | Friesen et al. | 95/45 X |
| 5,657,624 | 8/1997 | Kang et al. | 60/39.02 |
| 5,733,435 | 3/1998 | Prasad et al. | 95/54 X |
| 5,753,007 | 5/1998 | Russek et al. | 95/54 X |
| 5,753,010 | 5/1998 | Sircar et al. | 95/45 |

FOREIGN PATENT DOCUMENTS

| | | | |
|---|---|---|---|
| 2257054 | 1/1993 | United Kingdom | 95/54 |

OTHER PUBLICATIONS

Suitor et al., "Development of Alternative Oxygen Production Source using a Zirconia Solid Electrolyte Membrane", JPL Pub. D–7790 (1990).

*Primary Examiner*—Robert Spitzer
*Attorney, Agent, or Firm*—Bharat C. Gandhi

[57] ABSTRACT

A process for producing at least an oxygen product gas stream, and power from a gas turbine, by compressing a feed gas stream containing elemental oxygen and heating the feed gas stream on the retentate side of an ion transport reactor membrane section to produce a heated feed gas stream. Oxygen permeating the ion transport reactor membrane section is reacted with a first fuel gas stream to produce a first combustion products gas stream. The heated feed gas stream is separated using an ion transport separator membrane section having a retentate side and a permeate side into an oxygen-depleted gas stream on the retentate side and an oxygen-containing gas stream on the permeate side. At least a portion of the first combustion products gas stream can be recovered, and energy is extracted from at least one gas stream to be expanded in a gas turbine to produce energy.

20 Claims, 7 Drawing Sheets

SOLID ELECTROLYTE IONIC CONDUCTOR SYSTEMS FOR OXYGEN, NITROGEN, AND/OR CARBON DIOXIDE PRODUCTION WITH GAS TURBINE

U.S. GOVERNMENT RIGHTS

This invention was made with United States Government support under Cooperative Agreement No. 70NANB5H1065 awarded by the National Institute of Standards and Technology. The United States Government has certain rights in the invention.

FIELD OF THE INVENTION

The invention relates to the use of solid electrolyte ionic conductor membranes in gas separating systems. In particular, the invention relates to employing ion transport reactors to generate thermal conditions desired for ion transport separator operation, by reacting a fuel stream with transported oxygen, and to provide improved processes for the coproduction of power and oxygen, nitrogen and/or carbon dioxide by integration with a gas turbine power cycle.

BACKGROUND OF THE INVENTION

Non-cryogenic bulk oxygen separation systems, for example, organic polymer membrane systems, have been used to separate selected gases from air and other gas mixtures. Air is a mixture of gases which may contain varing amounts of water vapor and, at sea level, has the following approximate composition by volume: oxygen (20.9%), nitrogen (78%), argon (0.94%), with the balance consisting of other trace gases. An entirely different type of membrane, however, can be made from certain inorganic oxides. These solid electrolyte membranes are made from inorganic oxides, typified by calcium- or yttrium-stabilized zirconium and analogous oxides having a fluorite or perovskite structure.

Although the potential for these oxide ceramic materials as gas separation membranes is great, there are certain problems in their use. The most obvious difficulty is that all of the known oxide ceramic materials exhibit appreciable oxygen ion conductivity only at elevated temperatures. They usually must be operated well above 500° C., generally in the 600° C. to 900° C. range. This limitation remains despite much research to find materials that work well at lower temperatures. Solid electrolyte ionic conductor technology is described in more detail in Prasad et al., U.S. Pat. No. 5,547,494, entitled Staged Electrolyte Membrane, which is hereby incorporated by reference to more fully describe the state of the art. The elevated temperatures of operation, however, make ion transport processes intrinsically well suited for intergration with high temperature processes such as vapor-based, gas-based, or combined power cycles.

Recent developments have produced solid oxides which have the ability to conduct oxygen ions at elevated temperatures if a chemical driving potential is applied. These pressure-driven ionic conductor materials may be used as membranes for the extraction of oxygen from oxygen-containing gas streams if a sufficient partial oxygen pressure ratio is applied to provide the chemical driving potential. Since the selectivity of these materials for oxygen is infinite and oxygen fluxes several orders of magnitude higher than for polymeric membranes can be obtained, attractive opportunities are created for the production of oxygen as well as for oxygen-requiring oxidation processes, especially with applications that involve elevated temperatures. A prominent example is gas turbine cycles which typically process a significant amount of excess air to keep the turbine inlet temperature within the capabilities of available materials and therefore make available excess oxygen for recovery as a coproduct.

Some of the key problems that have to be addressed in the design of ion transport membrane systems and their integration into a high temperature cycle such as a gas turbine involve maximizing driving forces for ion transport, minimizing gaseous diffusion resistance, avoiding excessive stresses from thermal and compositional expansion and contraction and sealing the ion transport elements within the ion transport apparatus. The latter problem is aggravated by the fact that the ion transport membrane operating temperature is in the range from 500° C. to 1100° C.

Advances in the state of the art of air separation using solid electrolyte ionic conductors have been presented in the technical literature. For example, Mazanec et al., U.S. Pat. No. 5,306,411, entitled Solid Multi-Component Membranes, Electrochemical Reactor Components, Electrochemical Reactors and Use of Membranes, Reactor Components, and Reactor for Oxidation Reactions, relates to electrochemical reactors for reacting an oxygen-containing gas with an oxygen-consuming gas and describes a shell and tube reactor with the oxygen-containing gas flowing on one side of the solid electrolytic membrane and the oxygen-consuming gas on the other. Mazanec et al., however, does not address issues related to integrating such systems with oxygen production from gas turbine cycles, heat management to maintain membrane surfaces at the desired uniform temperatures, flow dynamics to achieve effective mass transfer, or the need for balancing reaction kinetics with oxygen ion conductivity to maintain the appropriate oxygen partial pressure for materials stability.

Kang et al., U.S. Pat. No. 5,565,017, entitled High Temperature Oxygen Production with Steam and Power Generation, relates to a system integrating an ion transport membrane with a gas turbine to recover energy from the retentate gas stream after it is heated and steam is added. The injection of steam or water into the ion transport nonpermeate stream compensates for the loss of the oxygen mass from the turbine feed gas stream.

Kang et al., U.S. Pat. No. 5,562,754, entitled Production of Oxygen By Ion Transport Membranes with Steam Utilization, discloses a system integrating an ion transport membrane with a gas turbine to recover energy from the retentate gas stream after it is heated. Steam is added as a sweep gas on the permeate side to enhance oxygen recovery. A stream containing a mixture of oxygen and steam is produced on the permeate side which can be withdrawn as a product.

Kang et al., U.S. Pat. No. 5,516,359, entitled Integrated High Temperature Method for Oxygen Production, describes heating a compressed air feed gas stream to the appropriate ion transport operating temperature by a first combustor which, in one embodiment, is inserted between the compressor discharge and the ion transport separator. Subsequently, the retentate gas stream from the ion transport separator is heated to turbine inlet temperature by a second combustor. The inlet temperatures to the turbine and the ion transport separator are independently controlled by adjusting the fuel rates to the two combustors. In an alternate configuration, a heat exchanger is placed between the two combustors, which are both located downstream from the ion transport separator, and the air feed gas stream to the ion transport separator is heated to the correct temperature by this heat exchanger.

The method disclosed in the Kang et al. '359 patent has the disadvantage that the feed gas stream to the ion transport separator contains products of combustion which dilute the ion transport separator feed gas stream, reduce the oxygen driving force, and could act as an adverse contaminant to some mixed conductor materials. Because some of the oxygen contained in the feed air is consumed in the first combustor, the oxygen driving force is further reduced. The alternative configuration has the disadvantage of requiring an additional, potentially expensive, heat exchanger. Either method could also have a problem maintaining stable combustion in the first combustor since the fuel-to-air equivalence ratio will be low, especially where the heat contained in the turbine exhaust is regeneratively recovered by the feed air gas stream and the heat duty of the first combustor is small.

Hegarty, U.S. Pat. No. 4,545,787, entitled Process for Producing By-Product Oxygen from Turbine Power Generation, relates to a process for generating net power using a combustion turbine, accompanied by the recovery of by-product oxygen-enriched gas. Air is compressed and heated, at least a portion of the air is combusted and a portion of the oxygen is removed from the air or combustion effluent using an air separator. The oxygen lean combustion effluent is expanded through a turbine to produce power. In an alternative embodiment, the effluent from the turbine is used to produce steam to generate additional power. In this process, the type of fuel is generally limited to "clean" fuels such as natural gas, oils, or synthesis gas.

Chen, U.S. Pat. No. 5,035,727, entitled Oxygen Extraction from Externally Fired Gas Turbines, relates to a process for recovering high purity oxygen from an externally fired power generating gas turbine cycle. While this process is similar to the Hegarty '787 patent, Chen differs in the use of an externally fired gas turbine so that other types of fuels such as coal or biomass may be used.

Chen et al., U.S. Pat. No. 5,174,866, entitled Oxygen Recovery from Turbine Exhaust Using Solid Electrolyte Membrane, and Chen et al., U.S. Pat. No. 5,118,395, entitled Oxygen Recovery from Turbine Exhaust Using Solid Electrolyte Membrane, both relate to processes for extracting high purity oxygen from gas turbine exhaust streams by passing the gas turbine exhaust over an oxygen ion conducting membrane. In these processes, the oxygen separator employing an oxygen ion conducting membrane is placed downstream of some or all stages of the gas turbine, instead of upstream as in earlier patents. An electrically-driven ion transport unit is proposed when the turbine exhaust pressure is low. The exhaust stream from the oxygen separator is optionally expanded through a gas turbine stage.

OBJECTS OF THE INVENTION

It is therefore an object of the invention to provide an efficient process for the coproduction of power and oxygen, and optionally nitrogen and carbon dioxide, and to effect improved integration of ion transport technology with a gas turbine power cycle.

It is also an object of the invention to permit the coproduction of carbon dioxide, with water as the only major impurity, and high purity nitrogen.

It is still another object of the invention to maximize the recovery of oxygen, especially in those cases where both carbon dioxide and oxygen coproducts are desired.

SUMMARY OF THE INVENTION

The invention comprises a process for producing at least an oxygen product gas stream, and power from a gas turbine, by compressing a feed gas stream containing elemental oxygen, and then heating the feed gas stream using a fuel-oxygen reaction with an ion transport reactor membrane section and thereby producing a heated feed gas stream. Preferably, the oxygen permeating the ion transport reactor membrane section is reacted in a first permeate zone with a first fuel gas stream to produce a first combustion products gas stream. The heated feed gas stream is separated into an oxygen-depleted gas stream on a retentate side of an ion transport separator membrane section and an oxygen product gas stream on the permeate side of the separator membrane section. At least a portion of the first combustion products gas stream may be recovered and energy is extracted from at least one gas stream to be expanded, such as the oxygen-depleted gas stream, after that stream to be expanded has been heated directly or indirectly by the first permeate zone reaction, in a gas turbine to produce power.

In a preferred embodiment of the invention the oxygen-depleted gas stream is reacted in a combustor with a fuel gas stream to produce a second combustion products gas stream. In another preferred embodiment of the invention, at least a portion of the first combustion products gas stream is combined with at least a portion of the oxygen-depleted gas stream from the retentate side of the ion transport separator membrane section to form an aggregate gas stream; and the aggregate gas stream in the combustor is reacted with the fuel gas stream to produce a second combustion products gas stream. In yet another preferred embodiment of the invention, the water is removed from at least a portion of the first combustion products gas stream to produce a carbon dioxide product gas stream. In another preferred embodiment of the invention, at least a portion of the energy recovered by the gas turbine is used to accomplish the compression step. In a preferred embodiment of the invention, at least a portion of the oxygen-depleted gas stream is recovered as a nitrogen product gas stream.

The term "module" refers to a shell containing one or more ion transport membrane sections. Unless noted to the contrary hereinafter, a description of operations performed by two or more modules applies to alternative embodiments in which such operations are performed by two or more ion transport membrane sections disposed in a single module. The term "section" refers to at least a portion of an ion membrane element which may be shaped as a tubular, planar, or other type of structure.

BRIEF DESCRIPTION OF THE DRAWINGS

Other objects, features and advantages of the invention will occur to those skilled in the art from the following description of preferred embodiments of the invention and the accompanying drawings, in which.

DETAILED DESCRIPTION OF THE INVENTION

Figure 1:
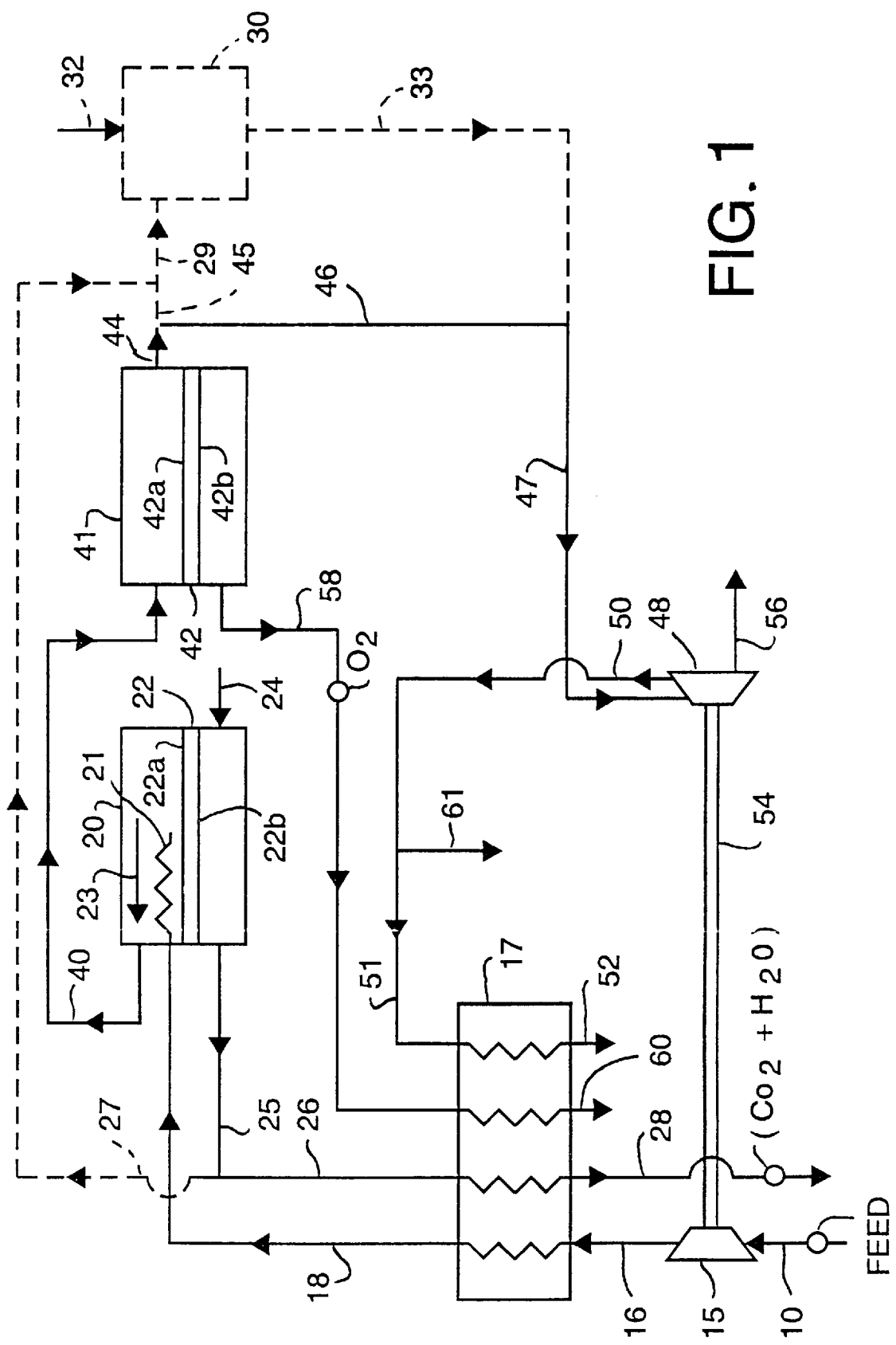
FIG. 1 is a schematic diagram of an embodiment of the invention using a solid electrolyte ionic conductor separator module in combination with an ion transport reactor module and a turbine to produce an oxygen product gas stream, a carbon dioxide product gas stream, and power.

The essence of the invention is to combine a gas turbine process with recovery of at least an oxygen product by an ion transport separator membrane section, wherein final heating of a feed stream to the separator's operating temperature is performed by reacting a fuel on the permeate side of a reactor membrane section comprising an ion transport reactor, a reactor-heater, or a combination reactor-separator. The reactor membrane section and the separator membrane section are different, spaced apart membranes in some embodiments and are different portions of a unitary membrane structure in other embodiments.

This invention may be accomplished by installing at least one ion transport oxygen reactor, having an ion transport membrane, in a gas turbine cycle power generation configuration to perform at least a portion of the heating function for a feed air stream to bring it up to ion transport operating temperature by reacting a fuel introduced into the permeate side of the ion transport membrane with transported oxygen. Such a reactive purge enhances oxygen transport across the membrane by reducing the oxygen partial pressure, by consuming the oxygen and/or by sweeping the membrane with products of combustion, and therefore increases the driving potential for oxygen transport to the reacting side. Oxygen from the feed gas stream, generally air, will be partially extracted in the ion transport reactor to support the reaction. When the permeate exit gas stream containing steam and carbon dioxide is then cooled, water condenses out of the gas stream and a carbon dioxide gas stream, saturated with water vapor but otherwise pure, is obtainable as desired. In another construction, the permeate side of the reactor is operated at substantially the same pressure as the retentate side, and the exiting permeate stream is joined with the retentate emerging from an ion transport separator.

The retentate from the ion transport reactor preferably is further processed in a second ion transport membrane to produce oxygen on the permeate side and an oxygen-depleted gas stream on the retentate side. In some configurations the retentate gas stream, which has been partially depleted of oxygen in the ion transport reactor, is combusted using a fuel and expanded in a gas turbine to produce power. The exhaust from the gas turbine is generally hot enough to preheat the feed stream in a heat exchanger or can be used to produce steam that will be utilized in a steam-based power generation portion of the process.

As will be seen from the following description of the invention, especially in its preferred modes, the instant process eliminates some of the major shortcomings of the prior art, especially with respect to avoiding contamination of the ion transport feed gas stream with combustion products, reduction of the oxygen driving force, and operating difficulties due to low fuel-to-air equivalency ratios with relatively simple process flow arrangements. In addition, the invention has the advantage of reducing $NO_x$ emissions and providing options for coproduction of carbon dioxide and nitrogen. Preferred embodiments of the present invention use a combustion products gas stream as a purge gas for enhancing oxygen recovery in the ion transport separator. The use of an ion transport reactor-heater or ion transport reactor-separator provides a very economical way for obtaining the purge gas for the ion transport separator. Alternatively, the invention permits recovery as desired of a carbon dioxide product from the process, since the combustion products purge gas stream or exhaust gas stream emerging from the ion transport reactor will be primarily water and carbon dioxide. The water in the exhaust gas stream can be condensed and recycled as a gas stream addition to the turbine feed and there is usually sufficient waste heat available there to permit adding extra water. Generally, the turbine waste gas stream will have a high nitrogen content and lends itself to economical recovery of nitrogen. Some of the processes according to the invention are distinguishable from the prior art described in the Background in that a combustion products gas stream is utilizable as a purge gas stream for the ion transport separator. Another distinguishing feature is that, if steam is desired as a purge medium, a significant fraction of the injected steam is obtainable from residual products of combustion.

When employed in purging the permeate side of an ion transport reactor, a key advantage of the present invention is that it uses products of combustion (such as steam or carbon dioxide) as a purge gas, thereby reducing the effective partial pressure of oxygen on the purge side of the ion transport membrane. This enhances the driving force across the ion transport membrane, and effects a higher oxygen flux and a lower membrane area requirement.

The elevated temperatures of operation make the ion transport process intrinsically well suited for integration with high temperature processes. Incorporation of an ion transport unit in an existing gas turbine power plant is straightforward, and the benefits accrued in such a retrofit will more than offset the cost of installing the ion transport unit and accessories. In the process configuration of this invention, the ion transport oxygen separator is thermally decoupled from the gas turbine. Thus each equipment may operate at its respective operating temperature. Also, the pressure drop across the ion transport unit itself will be relatively small. Thus a retrofit according to the present invention should not adversely affect the efficiency and performance of the existing power plant.

An ideal opportunity for synergistic integration with ion transport membranes is provided by using gas turbine systems according to the present invention, since turbines recover power from expanding hot gases. In the power generation process, air is compressed and then heated by direct combustion of fuel. To limit the temperature rise and stay within the temperature capabilities of available materials a significant amount of excess air is utilized in the combustion process. This, therefore, provides an ideal opportunity of extracting a portion of the excess oxygen from the high pressure gas stream by a high temperature membrane process.

The working fluid in a gas turbine power cycle is generally air or the products of combustion of fuel and air. If a fuel is used in such a system, heat is generated within the system by the fuel being combusted in a compressed air stream, and the resultant combustion products gas stream is expanded through a gas turbine to produce power. It should be noted that the metallurgical temperature limit on the turbine blades necessitates a gas turbine operation with a very high air-to-fuel ratio. In a conventional gas turbine system, the nitrogen in the feed air and the excess oxygen present in the combustion products gas stream act as diluents and thereby lower the temperature of the combustion products gas stream. As a result, the exhaust gas stream from the gas turbine power cycle contains excess oxygen in which additional fuel could be burnt. These hot exhaust gases could also be used to preheat the compressed feed air or may be used to generate steam that can be employed in a vapor power cycle.

It is also possible to recover some of the remaining oxygen in the exhaust gases in a gas turbine cycle using ion transport membrane technology. Most oxygen generating systems utilize cryogenic gas separation methods (high purity, large scale) or membrane and adsorptive separation techniques. For example, organic polymer membrane systems are typically very power intensive, and are usually suitable only for the production of small quantities of oxygen-enriched air (for example, 50% oxygen). Pressure swing adsorption systems typically produce 90 to 95% purity oxygen in small to medium quantities. Although some of these conventional processes recover a part of the power utilized in producing the product, they do not produce any net power. In addition, conventional oxygen separation processes operate at low temperatures, typically less than 100° C. and do not benefit significantly from integration with a power generation process.

Unlike the present invention, U.S. Pat. No. 5,516,359 (Kang et al.), mentioned above in the Background, does not address the coproduction of carbon dioxide or nitrogen, nor does it disclose the design of the enabling apparatus or contemplate the use of ion transport reactors which, by excluding nitrogen from the reaction product gas stream, enables the recovery of carbon dioxide or its use as purge or sweep gas stream for ion transport separators. In some of the reactor heater configurations according to the present invention there is the additional advantage that the oxygen driving force in the ion transport separator is not reduced by the presence of products of combustion. The present invention also differs by substituting an ion transport reactor for the first stage combustor or an ion transport reactor-separator in a single unit for the first stage combustor and the ion transport separator, or by placing the lower temperature combustor into the turbine exhaust stream rather than the inlet stream.

Several embodiments incorporating an ion transport membrane into a gas turbine system, including retrofit of a turbine power generation system, are disclosed in U.S. Pat. No. 5,852,925 which is a divisional of U.S. Ser. No. 08/490, 362, now abandoned, both of which are incorporated herein by reference and correspond to EP Publ. No. 748,648.

Reactive purge arrangements are disclosed in U.S. Pat. No. 5,837,125 and E.P. Publ. No. 778,069, and incorporated herein by reference. Various ion transport reactor designs are disclosed in U.S. Pat. No. 5,820,655, and U.S. Pat. No. 5,820,654, both of which are also incorporated herein by reference. All of the patent applications referenced in this paragraph are commonly owned with the present application.

The ion transport membranes employed in the oxygen separators, the ion transport reactors, the ion transport reactor-heaters, the ion transport reactor-separators, or ion transport separator-combustors discussed herein are solid electrolyte ionic conductors. These materials may be selected appropriate to the particular performance characteristics necessary or advantageous for the intended function and, therefore, different ion transport materials may be used in different modules. Ion transport materials that transport oxygen ions are deemed useful for the separation of oxygen from gas mixtures. Certain ion transport materials are mixed conductors, conducting both oxygen ions and electrons. At elevated temperatures, these materials contain mobile oxygen ion vacancies that provide conduction sites for selective transport of oxygen ions through the material. The transport is driven by the partial pressure ratio of oxygen across the membrane: oxygen ions flow from the side with high oxygen partial pressure to that with low oxygen partial pressure. Ionization of oxygen to oxygen ions takes place on the cathode or retentate side of the membrane, and the ions are then transported across the ion transport membrane. The oxygen ions deionize on the permeate side of the membrane, releasing oxygen molecules. For materials that exhibit only ionic conductivity, external electrodes are placed on the surfaces of the electrolyte and the electronic current is carried in an external circuit. In mixed conducting materials electrons are transported to the cathode internally, thus completing the circuit and obviating the need for external electrodes. Dual phase conductors, in which an oxygen ion conductor is mixed with an electronic conductor, may also be used for the same applications.

Table I is a partial list of ion transport materials of interest for oxygen separation.

| Material composition |
| --- |
| 1. $(La_{1-x}Sr_x)(Co_{1-y}Fe_y) O_{3-\delta}$ ($0 \leq x \leq 1$, $0 \leq y \leq 1$, $\delta$ from stoichimetry) |
| 2. $SrMnO_{3-\delta}$ |
|     $SrMn_{1-x}Co_xO_{3-\delta}$ ($0 \leq x \leq 1$, $\delta$ from stoichimetry) |
|     $Sr_{1-x}Na_xMnO_{3-\delta}$ |
| 3. $BaFe_{0.5}Co_{0.5}YO_3$ |
|     $SrCeO_3$ |
|     $YBa_2Cu_3O_{7-\beta}$ ($0 \leq \beta \leq 1$, $\beta$ from stoichimetry) |
| 4. $La_{0.2}Ba_{0.8}Co_{0.8}Fe_{0.2}O_{2.6}$; $Pr_{0.2}Ba_{0.8}Co_{0.8}Fe_{0.2}O_{2.6}$ |
| 5. $A_xA'_{x'}A''_{x''}B_yB'_{y'}B''_{y''}O_{3-z}$ (x, x', x'', y, y', y'' z all in 0–1 range) where: A, A', A'' = from groups 1, 2, 3 and f-block lanthanides B, B', B'' = from d-block transition metals |
| 6. (a) Co—La—Bi type:     Cobalt oxide     15–75 mole % |
|                                      Lanthanum oxide     13–45 mole % |
|                                      Bismuth oxide     17–50 mole % |
|     (b) Co—Sr—Ce type:     Cobalt oxide     15–40 mole % |
|                                      Strontium oxide     40–55 mole % |
|                                      Cerium oxide     15–40 mole % |
|     (c) Co—Sr—Bi type:     Cobalt oxide     10–40 mole % |
|                                      Strontium oxide     5–50 mole % |
|                                      Bismuth oxide     35–70 mole % |
|     (d) Co—La—Ce type:     Cobalt oxide     10–40 mole % |
|                                      Lanthanum oxide     10–40 mole % |
|                                      Cerium oxide     30–70 mole % |

-continued

| Material composition | | | |
|---|---|---|---|
| (e) Co—La—Sr—Bi type: | Cobalt oxide | 15–70 | mole % |
| | Lanthanum oxide | 1–40 | mole % |
| | Strontium oxide | 1–40 | mole % |
| | Bismuth oxide | 25–50 | mole % |
| (f) Co—La—Sr—Ce type: | Cobalt oxide | 10–40 | mole % |
| | Lanthanum oxide | 1–35 | mole % |
| | Strontium oxide | 1–35 | mole % |
| | Cerium oxide | 0–70 | mole % |

7. $Bi_{2-x-y}M'_xM_yO_{3-\delta}$ ($0 \leq x \leq 1$, $0 \leq y \leq 1$, $\delta$ from stoichimetry)
where: M' = Er, Y, Tm, Yb, Tb, Lu, Nd, Sm, Dy, Sr, Hf, Th, Ta, Nb, Pb, Sn, In, Ca, Sr, La and mixtures thereof
M = Mn Fe, Co, Ni, Cu and mixtures thereof 8. $BaCe_{1-x}Gd_xO_{3-x/2}$ where,
x equals from zero to about 1.

9. One of the materials of $A_sA'_tB_uB'_vB''_wO_x$ family whose composition is
disclosed in U.S. Pat. No. 5,306,411 (Mazanec et al.) as follows:
A represents a lanthanide or Y, or a mixture thereof;
A' represents an alkaline earth metal or a mixture thereof;
B represents Fe;
B' represents Cr or Ti, or a mixture thereof;
B" represents Mn, Co, V, Ni or Cu, or a mixture thereof;
and s, t, u, v, w, and x are numbers such that:
s/t equals from about 0.01 to about 100;
u equals from about 0.01 to about 1;
v equals from zero to about 1;
w equals from zero to about 1;
x equals a number that satisfies the valences of the A, A', B, B', B" in the formula; and $0.9 < (s + t)/(u + v + w) < 1.1$ 10. One of the materials of $La_{1-x}Sr_xCu_{1-y}M_yO_{3-d}$ family, where:
M represents Fe or Co;
x equals from zero to about 1;
y equals from zero to about 1;
d equals a number that satisfies the valences of La, Sr, Cu, and M in the formula.

11. One of the materials of $Ce_{1-x}A_xO_{2-d}$ family, where:
A represents a lanthanide, Ru, or Y; or a mixture thereof;
x equals from zero to about 1;
d equals a number that satisfies the valences of Ce and A in the formula.

12. One of the materials of $Sr_{1-x}Bi_xFeO_{3-d}$ family, where:
x equals from zero to about 1;
d equals a number that satisfies the valences of Ce and A in the formula.

13. One of the materials of $Sr_xFe_yCo_zO_w$ family, where:
x equals from zero to about 1;
y equals from zero to about 1;
z equals from zero to about 1;
w equals a number that satisfies the valences of Sr, Fe and Co in the formula.

14. Dual phase mixed conductors (electronic/ionic):
$(Pd)_{0.5}/(YSZ)_{0.5}$
$(Pt)_{0.5}/(YSZ)_{0.5}$
$(B-MgLaCrO_x)_{0.5}(YSZ)_{0.5}$
$(In_{90\%}Pt_{10\%})_{0.6}/(YSZ)_{0.5}$
$(In_{90\%}Pt_{10\%})_{0.5}/(YSZ)_{0.5}$
$(In_{95\%}Pr_{2.5\%}Zr_{2.5\%})_{0.5}/(YSZ)_{0.5}$
Any of the materials described in 1–13, to which a high temperature metallic phase (e.g., Pd, Pt, Ag, Au, Ti, Ta, W) is added.

Owing to their infinite selectivity for oxygen transport, ion transport materials have several potential applications in the area of air separation and purification of gases. As ion transport materials generally exhibit appreciable ionic conductivities only at elevated temperatures (greater than 450° C.), however, they are different from traditional oxygen separation processes which operate at low temperatures (less than 100° C.). Most oxygen generating systems utilize cryogenic separation methods (generally for large scale, high purity applications) or use polymeric membrane or adsorptive separation techniques (generally for small to medium scale, 90–95% purity applications). Membrane systems are typically very power intensive and are suitable for the production of nitrogen and for the production of small quantities of oxygen-enriched air (for example, 50% oxygen).

In preferred embodiments of the invention, compressed air is directly fed to an ion transport reactor where fuel is reacted with permeated oxygen on the permeate side of the ion transport membrane to produce the necessary heat for elevating the air to the appropriate ion transport operating temperature. The retentate gas stream is then heated to turbine inlet temperature in a conventional combustor located downstream. The reaction side fuel-to-oxygen ratio can be at stoichiometric or slightly fuel-rich ratios to achieve stable combustion. At the same time, with the appropriate ion transport reactor design described in U.S. Pat. No. 5,820,655, which was incorporated by reference above, the reaction taking place at the ion transport reactor membrane surface will be in an environment that substantially excludes nitrogen (except for any nitrogen which may be present in the fuel) and be at a relatively low uniform temperature and therefore minimize $NO_x$ generation. The products of combustion from the ion transport reactor can either join the retentate gas stream downstream of the ion transport oxygen separator or optionally be withdrawn to recover carbon dioxide as a coproduct or used as a purge gas for the permeate side of the ion transport separator to improve oxygen recovery. If carbon dioxide is a desirable product, this is advantageous since the products of combustion will contain primarily carbon dioxide and water which can be readily removed by condensation. Because the partial oxygen pressures on the permeate side of the ion transport reactor are very low, driving forces are high and minimize ion transport area requirements. At the same time the low oxygen partial pressure (less than $10^{-14}$ atm.) will require selection of a stable mixed conductor composition at these low pressures.

It can be readily appreciated that the suggested process arrangement provided herein provides solutions to the shortcomings of previous processes and many advantages are provided. For example, the inlet temperatures to the ion transport oxygen separator and the turbine can be independently controlled at their respective optimum operating temperatures (700° C. to 950° C. for the ion transport separator and 1000° C. to 1400° C. for the turbine) by adjusting fuel rates to the ion transport reactor and the combustor. In addition, since the combustion reaction is limited to the permeate side of the ion transport reactor, both contamination and dilution of the ion transport separator feed gas stream are avoided. The fuel-to-oxygen ratios in the ion transport reactor are sufficiently high to yield stable combustion during the process to provide a continuous output of products. It should also be noted that the general arrangement is simple since the ion transport reactor combines the duties of a heat exchanger and combustor. As previously stated, employment of an ion transport module will reduce $NO_x$ production and permit withdrawing a relatively rich carbon dioxide coproduct gas stream if desired. Finally, steam can be added as a diluent to the permeate side of the ion transport membrane to help in controlling the reaction.

FIG. 1 is a schematic diagram of an embodiment of the invention using a solid electrolyte ionic conductor separator module in combination with an ion transport reactor module and a turbine to produce an oxygen product gas stream, a carbon dioxide product gas stream, and power. In this embodiment of the invention, ion transport reactor module 20 and ion transport separator module 41 have been integrated with gas turbine 48 in a Brayton cycle to enable oxygen extraction from the feed gas stream 10.

During operation, feed gas stream 10 is compressed by compressor 15 to a pressure of 12 atm. Compressed gas stream 16 is heated to 880° F. (470° C.) in heat exchanger 17 by hot carbon dioxide gas stream 26, hot oxygen gas stream 58, and waste gas stream 51, to produce heated gas stream 18. Heated gas stream 18 then enters ion transport reactor 20 through open-ended heater tubes 21 and is heated to 1470° F. (800° C.), which is the typical operating temperature of ion transport separator 41.

Ion transport reactor 20 contains ion transport membrane 22 having a retentate side 22a and a permeate side 22b. Heat needed to raise the temperature of heated gas stream 18 to ion transport separator 41 operating temperature, is generated by the reaction of fuel gas stream 24, for example, methane, with oxygen permeating to the permeate side 22b of ion transport membrane 22, provided by pressure-driven oxygen ion transport across ion transport membrane 22. Typically ion transport membrane 22 will contain catalysts to enhance the reaction on the permeate side 22b of ion transport membrane 22 to produce combustion products gas stream 25. The reaction in ion transport reactor 20 is preferentially operated slightly fuel-rich to maintain stable combustion. Depending on the reactor design, that is, the balance between oxygen flux and reaction kinetics, partial oxygen pressures on the permeate side 22b of ion transport membrane 22 may be sufficiently low (for example, less than $10^{-15}$ atm) to require use of an ion transport material stable at those low oxygen pressure conditions, such as the chromium containing perovskite listed in Table I as group 9. Ion transport reactor 20 performs the combined functions of a combustor and a heat exchanger so that retentate gas stream 40 exiting the retentate side 22a is at a temperature of 1470° F. And undiluted (uncontaminated) by any products of combustion. Combustion products gas stream 25, containing mostly carbon dioxide and water vapor, is directed as gas stream 26 which, as mentioned above, is cooled against compressed gas stream 16 in heat exchanger 17 to produce carbon dioxide product gas stream 28. Alternately, gas stream 25 is directed as optional gas stream 27 which is joined with gas stream 45 to make optional gas stream 29.

Hot retentate gas 23 exits ion transport reactor 20 as gas stream 40. Gas stream 40 is introduced into ion transport separator 41 containing ion transport membrane 42 having a retentate side 42a and a permeate side 42b where a fraction (for example, 40%) of the contained oxygen is separated by pressure-driven ion transport across ion transport membrane 42 to produce hot oxygen gas stream 58 and hot retentate gas stream 44. Hot oxygen gas stream 58, as mentioned above, is cooled against compressed gas stream 16 in heat exchanger 17 to produce oxygen product gas stream 60. Hot retentate gas stream 44 is directed as gas stream 46 to become gas stream 47. Gas stream 47 can be directly expanded in a low-temperature turbine 48 to drive compressor 15 through shaft 54.

Alternatively, for optimum efficiency, the turbine feed stream can be raised to a higher temperature as tolerated by a high-temperature turbine. This may be accomplished by using a heater (not shown) or, alternately, directing gas stream 44 as optional gas stream 45 which, as mentioned above, is joined with optional gas stream 27, if produced, to form optional gas stream 29. Optional gas stream 29 is passed into combustor 30 to react with fuel gas stream 32 to produce reaction products gas stream 33. Gas stream 33 becomes gas stream 47 which, being at the desired turbine inlet temperature (e.g. 2400° F. Or 1315° C.), is injected into a high-temperature turbine as gas turbine 48 to produce power to rotate shaft 54 to drive compressor 15, exhaust gas stream 50, and excess power 56. Exhaust gas stream 50 is directed as gas stream 51 which, as mentioned above, is cooled against compressed gas stream 16 in heat exchanger 17 to produce waste gas stream 52. Optionally, exhaust gas stream 50 is directed as gas stream 61 to be used for steam generation.

Table II illustrates the use of the embodiment of the invention shown in FIG. 1 for the production of 1,000,000 NCFH of oxygen. FIG. 1 and Table II clearly illustrates how ion transport reactor 20 and combustor 30 provide independently controlled operating temperatures for ion transport separator 41 and gas turbine 48 without compromising operation of ion transport separator 41 and unduly effecting system complexity and investment.

TABLE II

| | |
|---|---|
| Feed air stream 10 flow rate | $11.2 \times 10^6$ NCFH |
| Fuel gas streams 24 and 32 type | Natural Gas (methane) |
| Fuel gas stream 24 flow rate | $1.56 \times 10^5$ NCFH |
| Fuel gas stream 32 flow rate | $1.4 \times 10^6$ NCFH |
| Product oxygen gas stream 58 flow rate from ion transport separator 41 | $1 \times 10^6$ NCFH |
| Feed air stream 10 temperature | 70° F. |
| Gas stream 18 temperature after heat exchanger 17 | 880° F. |
| Gas stream 40 temperature after ion transport reactor 20 | 1470° F. |
| Gas stream 33 temperature after combustor 30 | 2000° F. |
| Turbine exhaust gas stream 50 temperature | 900° F. |
| Exhaust gas stream 52 temperature after heat exchanger 17 | 730° F. |
| Gas stream 16 pressure after compressor 15 | 12 atm. |
| Oxygen product gas stream 60 pressure | 1 atm. |
| Turbine exhaust gas stream 50 pressure | 1 atm. |
| Isentropic efficiency of compressor 15 | 86% |
| Isentropic efficiency of turbine 48 | 88% |
| Heat exchanger 17 effectiveness | 90% |
| Lower heating value of fuel | 900 BTU/NCFH |
| Power output from turbine 48 | 73.3 MW |
| Power consumed by compressor 15 | 40.9 MW |
| Power used for oxygen generation | 3.7 MW |
| Net power output | 32.4 MW |

The power penalty associated is that for compressing an additional quantity of feed air which is equal, in mass flow rate, to the quantity of oxygen produced. The value of 3.7 MW is associated with single stage compression without intercooling. In a retrofit case where supplemental air is compressed by an additional compressor, it may be well worthwhile to employ intercooling and reduce the power penalty by about 1 MW. In the standard case the capital penalty for producing oxygen are the cost of the ion transport reactor, the ion transport separator, and the cost of heat recovery from the product oxygen gas stream. These costs are partially compensated by savings due to smaller heat duties of the combustor and the heat exchanger.

It is evident that in place of a recovery heat exchanger, a Rankine cycle heat recovery system or other heat recovery system can be employed without materially changing the results.

Figure 2:
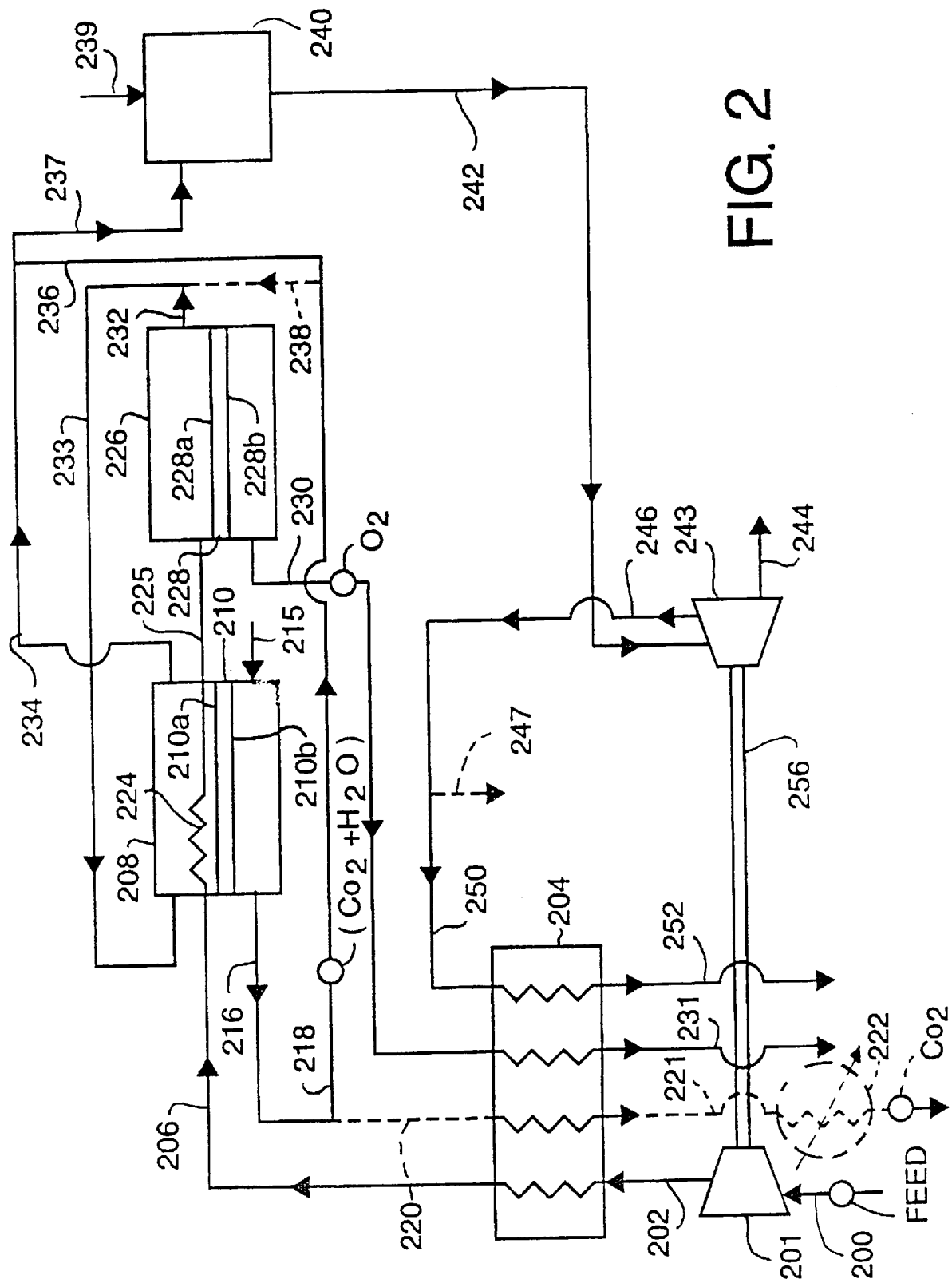
FIG. 2 is a schematic diagram of an embodiment of the invention using a solid electrolyte ionic conductor separator module in combination with an ion transport reactor-heater module and a turbine to produce an oxygen product gas stream and power.

FIG. 2 is a schematic diagram of an embodiment of the invention using a solid electrolyte ionic conductor separator module in combination with an ion transport reactor-heater module and a turbine to produce an oxygen product gas stream and power. FIG. 2 is a variation of FIG. 1 using an ion transport reactor-heater instead of an ion transport reactor to heat the air to ion transport operating temperature.

During operation, feed gas stream 200 is compressed by compressor 201 to a pressure of 12 atm. Compressed gas stream 202 is heated to approximately 600° F. to 1000° F. in heat exchanger 204 by optional hot carbon dioxide gas stream 220, hot oxygen gas stream 230, and waste gas stream 250, to produce heated gas stream 206. Heated gas stream 206 then traverses ion transport reactor-heater 208 through heater tubes 224 to become gas stream 225 heated to 1470° F., the operating temperature of ion transport separator 226.

Ion transport reactor-heater 208 contains ion transport membrane 210 having a retentate side 210a and a permeate side 210b. Heat needed to raise the temperature of heated gas stream 206 to ion transport separator 226 operating temperature, is generated by the reaction of fuel gas stream 215, for example, methane, with oxygen permeating to the permeate side 210b of ion transport membrane 210, provided by pressure-driven oxygen ion transport across ion transport membrane 210. Typically ion transport membrane 210 will contain catalysts to enhance the reaction on the permeate side 210b of ion transport membrane 210 to produce combustion products gas stream 216.

The reaction in ion transport reactor-heater 208 is preferentially operated slightly fuel-rich to maintain stable combustion. As before, ion transport reactor-heater 208 performs the combined functions of a combustor and a heat exchanger so that retentate gas stream 234 exiting the retentate side 210a is at a temperature of 1470° F. And undiluted (uncontaminated) by any products of combustion. Alternately, combustion products gas stream 216, containing mostly carbon dioxide and water vapor, is directed as gas stream 218 which is joined as gas stream 236 with gas stream 234 to make gas stream 237. Alternately, combustion products gas stream 216 may be directed as optional gas stream 220 which, as mentioned above, is cooled against compressed gas stream 202 in heat exchanger 204 to produce carbon dioxide and steam containing gas stream 221 from which carbon dioxide can be recovered after condensing out steam in condenser 222.

Hot feed gas stream 225 exits ion transport reactor-heater 208 and is introduced into ion transport separator 226 containing ion transport membrane 228 having a retentate side 228a and a permeate side 228b where a fraction (for example, 40%) of the contained oxygen is separated by pressure-driven ion transport across ion transport membrane 228 to produce hot oxygen gas stream 230 and hot retentate gas stream 232. Hot oxygen gas stream 230, as mentioned above, is cooled against compressed gas stream 202 in heat exchanger 204 to produce oxygen product gas stream 231.

Hot retentate gas stream 232 may be joined with optional gas stream 238, to become gas stream 233. Gas stream 233 is introduced into ion transport reactor-heater 208, where oxygen is removed, to produce gas stream 234. Gas stream 234 is joined with gas stream 236 to produce gas stream 237. Gas stream 237 is passed into combustor 240 to react with fuel gas stream 239 to produce reaction products gas stream 242. Gas stream 242, now at the desired turbine inlet temperature (typically greater than 2000° F.), is injected into gas turbine 243 to produce power 256 to drive compressor 201, exhaust gas stream 246, and excess power 244. Exhaust gas stream 246 is directed as gas stream 250 which, as mentioned above, is cooled against compressed gas stream 202 in heat exchanger 204 to produce waste gas stream 252. Optionally, exhaust gas stream 246 is directed as gas stream 247 to be used for steam generation.

The embodiment of the invention shown in FIG. 2 has the same advantages as that of FIG. 1. In addition, the FIG. 2 embodiment provides a higher oxygen driving force to reduce the ion transport separator area relative to the previous example, because, unlike the process shown in FIG. 1, no oxygen is removed from the air gas stream prior to entry into the ion transport separator. A disadvantage is the added heat transfer area 224 in the ion transport reactor-heater 208.

Figure 3A:
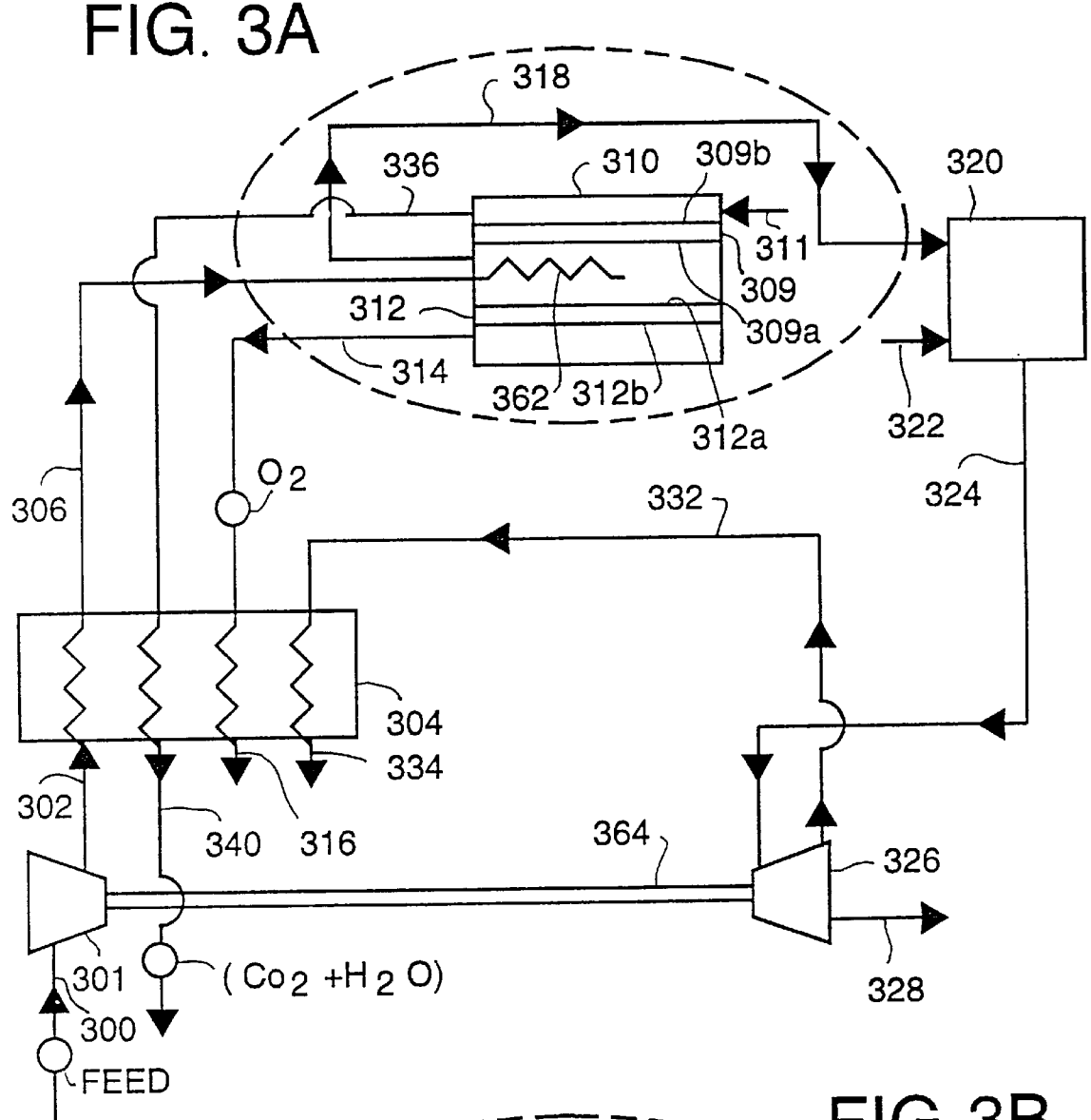
FIG. 3A is a schematic diagram of an embodiment of the invention similar to FIG. 2 using an integrated solid electrolyte ionic conductor reactor-separator module and a turbine to produce an oxygen product gas stream and power.

FIG. 3A illustrates a construction where the functions of the ion transport reactor and the ion transport separator of FIG. 2 are combined in a single reactor-separator unit. During operation, feed gas stream 300 is compressed by compressor 301 to a pressure of 12 atm. Compressed gas stream 302 is heated to 800° F. to 1000° F. in heat exchanger 304 by hot carbon dioxide gas stream 336, hot oxygen gas stream 314, and waste gas stream 332, to produce heated gas stream 306. Heated gas stream 306 then enters ion transport reactor-separator 310 through open-ended heater tubes 362 and is heated to the operating temperature of ion transport membrane 309, having a retentate side 309a and a permeate side 309b, and ion transport membrane 312, having a retentate side 312a and a permeate side 312b.

Heat needed to raise the temperature of heated gas stream 306 to ion transport membrane operating temperature is generated by the reaction of fuel gas stream 311, for example, methane, with oxygen permeating to the permeate side 309b of ion transport membrane 309, provided by pressure-driven oxygen ion transport across ion transport membrane 309. Typically ion transport membrane 309 will contain catalysts to enhance the reaction on the permeate side 309b of ion transport membrane 309 to produce combustion products gas stream 336. Combustion products gas stream 336, containing mostly carbon dioxide and water vapor, as mentioned above, is cooled against compressed gas stream 302 in heat exchanger 304 to produce carbon dioxide product gas stream 340. Simultaneously, ion transport membrane 312 separates some of the oxygen from the feed stream 306 by pressure-driven ion transport across ion transport membrane 312 to produce hot oxygen gas stream 314 and hot retentate gas stream 318.

Hot retentate gas stream 318 exits ion transport reactor-separator 310 and is passed into combustor 320 to react with fuel gas stream 322 to produce reaction products gas stream 324. Gas stream 324, being at the desired turbine inlet temperature (2400° F.), is injected into gas turbine 326 to produce power 364 to drive compressor 301, exhaust gas stream 332, and excess power 328. Exhaust gas stream 332 is, as mentioned above, cooled against compressed gas stream 302 in heat exchanger 304 to produce waste gas stream 334. Hot oxygen gas stream 314, as mentioned above, is cooled against compressed gas stream 302 in heat exchanger 304 to produce oxygen product gas stream 316.

Figure 3B:
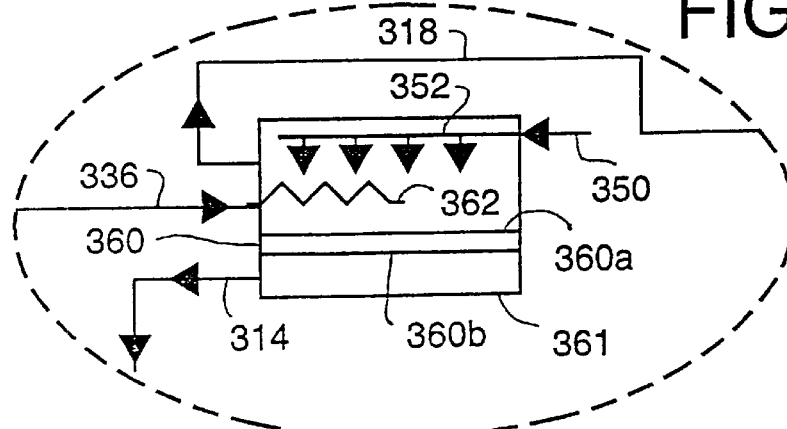
FIG. 3B is a detailed view of an alternate solid electrolyte ionic conductor combustor-separator module component for the embodiment of the invention shown in FIG. 3A.

FIG. 3B is a detailed view of an alternate solid electrolyte ionic conductor combustor-separator module component for the embodiment of the invention shown in FIG. 3A. In this embodiment, ion transport combustor-separator 361 includes ion transport membrane 360, having a retentate side 360a and a permeate side 360b. Reactive gas fuel stream 350 is injected into the retentate side of ion transport combustor-separator 361 using a distributor 352. In other ways, this embodiment would function as described with regard to FIG. 3A.

In one construction, distributor 352 is a porous wall or tube extending within combustor-separator 361. Distributor 352 preferably applies the reactive gas substantially uniformly over a substantial length of retentate side 360a to assure, in combination with heat transfer design of the reactor-separator, reasonably uniform temperatures of the ion transport membrane and substantially complete reactions of the reactive gas with oxygen. Since the combustion temperatures are relatively low, and to further assure complete combustion of the fuel, the reaction can be catalytically enhanced.

By comparison, in separator 310, FIG. 3A, very high reactive-gas-to-oxygen ratios may occur near the entry area of fuel stream 311. Incomplete combustion may result if the reactive gas is a combustible fuel and the ratio is close to or outside of the flammability limits of the fuel. Some of the fuel may be only partially oxidized, generating carbon monoxide or other pollutants which would emerge in stream 336.

Figure 4:
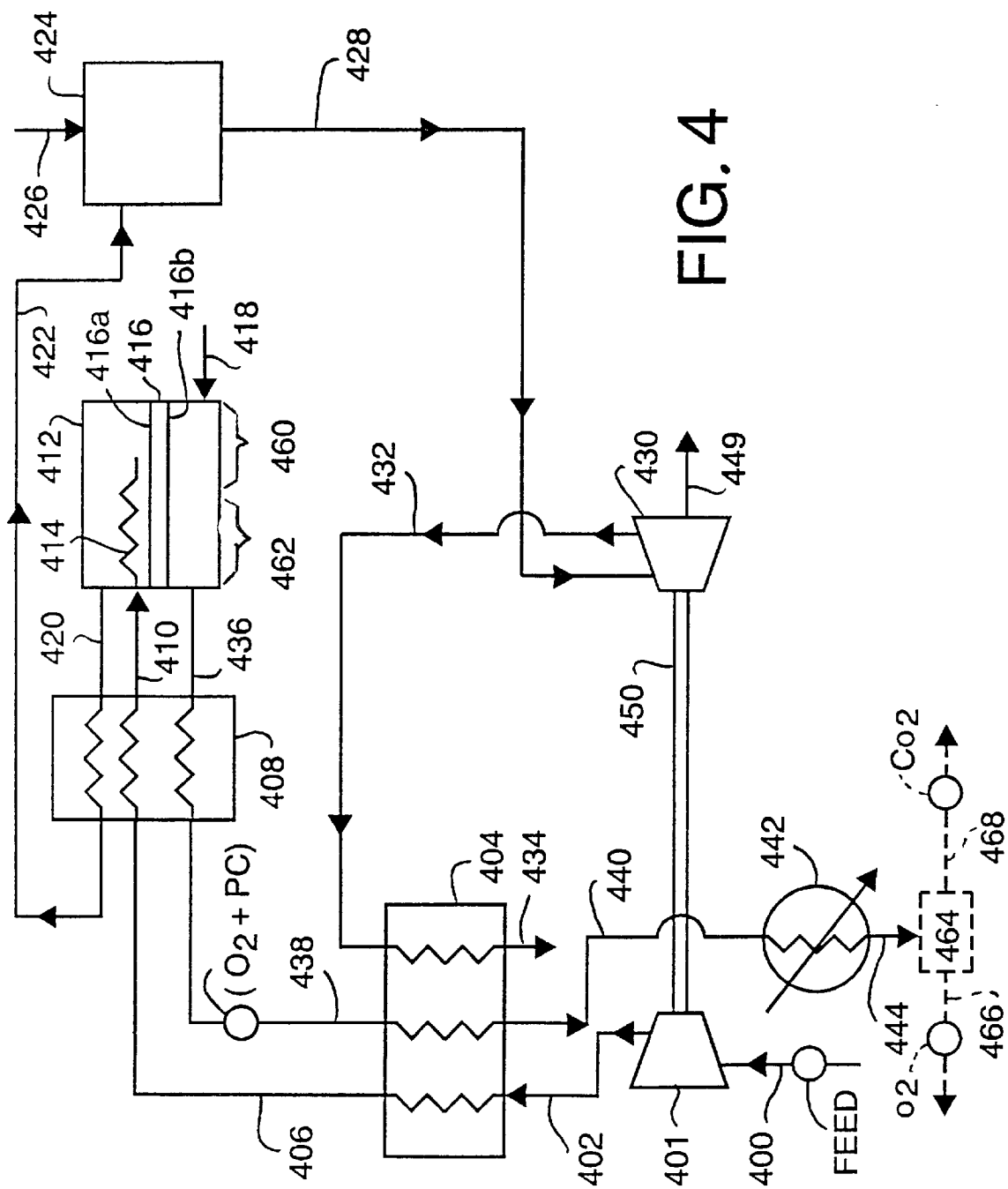
FIG. 4 is a schematic diagram of an embodiment of the invention using a solid electrolyte ionic conductor reactor separator module in combination with a combustor and a turbine to produce an oxygen product gas stream containing products of combustion and power.

FIG. 4 is a schematic diagram of an embodiment of the invention using a solid electrolyte ionic conductor reactor separator module in combination with a combustor and a turbine to produce an oxygen product gas stream and power. This embodiment is useful if the intended application requires that the oxygen product gas stream purity is 80% to 95% oxygen, or less.

During operation, feed gas stream 400 is compressed by compressor 401 to a pressure of 12 atm. Compressed gas stream 402 is heated to 800° F. to 1000° F. in heat exchanger 404 by hot gas stream 438 and waste gas stream 432, to produce heated gas stream 406. Gas stream 406 is heated to near ion transport operating temperature range in heat exchanger 408 by hot gas stream 436 and waste gas stream 420, to produce heated gas stream 410. Heated gas stream 410 then enters ion transport reactor-separator 412 through open-ended heater tubes 414 and is heated to the operating temperature of ion transport membrane 416, having a retentate side 416a and a permeate side 416b.

Membrane 416 includes a reactor section 460 and a separator section 462 as different sections of a unitary membrane structure such as disclosed in U.S. Pat. No. 5,820,654, and incorporated above by reference herein. The reactor section 460 preferably is one-fifth to one-half of the total length of membrane 416, more preferably about one-quarter of the total length, depending on the desired purity of product gas stream 444 as described below.

Heat needed to raise the temperature of heated gas stream 410 to ion transport membrane operating temperature is generated by the reaction of fuel gas stream 418, for example, methane, with oxygen permeating to the permeate side 416b of ion transport membrane 416, provided by pressure-driven oxygen ion transport across ion transport membrane 416. Typically ion transport membrane 416 will contain catalysts to enhance the reaction on the permeate side 416b of ion transport membrane 416 to produce gas stream 436 containing products of combustion PC and oxygen in a desired ratio. The amount of fuel and therefore the amount of energy that can be generated is limited by the oxygen product purity constraints which requires that the percentage of noncondensable gases present in the oxygen product gas stream does not exceed the impurity limits demanded by the application. Many, if not most, applications should be able to tolerate the products of combustion impurities contemplated, primarily carbon dioxide and water vapor. Optionally, gas stream 418 is an inert purge stream, wherein gas stream 436 is a diluted oxygen products stream. When the reactive purge is run fuel-lean such that reactions occur only within reactor section 460, gas stream 436 contains 80% to 95% oxygen, with the balance mostly carbon dioxide and water vapor. Gas stream 436, as mentioned above, is cooled in heat exchanger 408 to produce gas stream 438, which, in turn, is cooled in heat exchanger 404 to produce gas stream 440. Water vapor in gas stream 440 is condensed in condenser 442 to produce oxygen product gas stream 444, which contains 80% to 95% oxygen. In another construction, shown in phantom, a conventional gas separator 464 separates a purer oxygen stream 466 from a carbon dioxide stream 468.

Hot retentate gas stream 420 exits ion transport reactor-separator 412 and, as mentioned above, is cooled in heat exchanger 408 to produce gas stream 422, which, is passed into combustor 424 to react with fuel gas stream 426 to produce reaction products gas stream 428. Gas stream 428, being at the desired turbine inlet temperature (2400° F.), is injected into gas turbine 430 to produce power 450 to drive compressor 401, exhaust gas stream 432, and excess power 449. Exhaust gas stream 432 is, as mentioned above, cooled against compressed gas stream 402 in heat exchanger 404 to produce waste gas stream 434.

As the other embodiments, the embodiment of FIG. 4 permits independent control of the ion transport separator and turbine inlet temperatures. At the same time, the configuration of FIG. 4 simplifies the system by eliminating need for a separate ion transport reactor without significantly complicating separator internals.

Figures 5A, 5B:
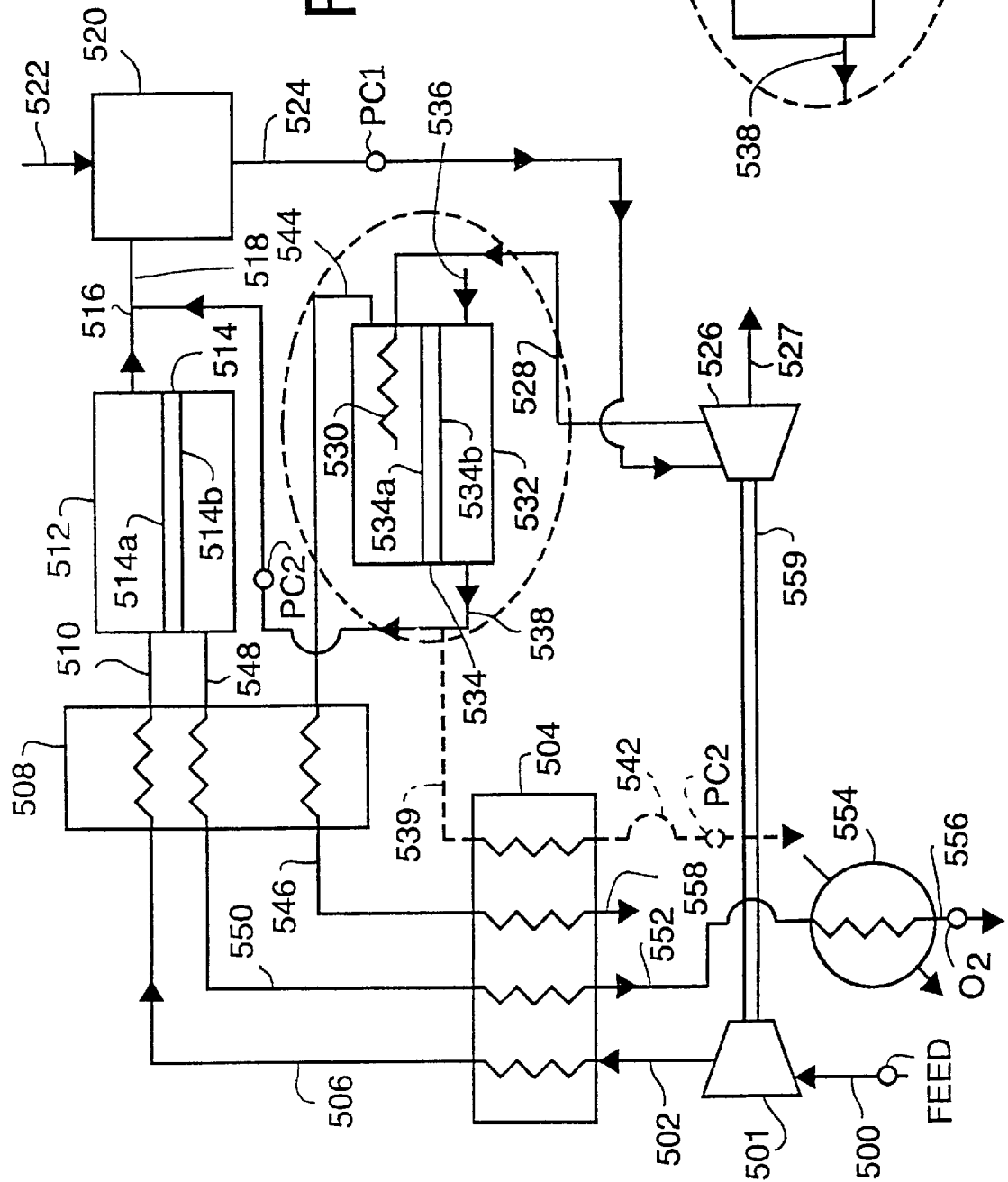
FIG. 5A is a schematic diagram of another embodiment of the invention using a solid electrolyte ionic conductor separator module in combination with an ion transport reactor module disposed downstream of a turbine to produce an oxygen product gas stream and power.
FIG. 5B is a detailed view of an alternate combustor component for the embodiment of the invention shown in FIG. 5A.

FIG. 5A illustrates an ion transport reactor positioned in a turbine exhaust stream, heating that exhaust stream to a temperature sufficiently high to efficiently operate an ion transport membrane, and then heating the compressed air feed stream to the required ion transport separator temperature by obtaining heat from a retentate stream.

During operation feed gas stream 500 is compressed by compressor 501 to a pressure of about 12 atm. Compressed gas stream 502 is heated to a temperature of 800 to 900° F. in recovery heat exchanger 504 by hot oxygen gas stream 550, hot retentate gas stream 546, and optionally hot permeate gas stream 539, to produce heated gas stream 506. Heated feed gas stream 506 is further heated to the required ion transport separator temperature in heat exchanger 508 by hot oxygen gas stream 548 and hot gas retentate stream 544 to produce heated gas stream 510. Heated gas stream 510 then enters ion transport separator 512 and passes along ion transport membrane 514, having a retentate side 514a and a permeate side 514b.

Gas stream 548, as mentioned above, is cooled in heat exchanger 508 to produce oxygen gas stream 550, which, in turn, is cooled in heat exchanger 504 to produce oxygen gas stream 552. Gas stream 552 is cooled in cooler 554 to produce cooled oxygen product gas stream 556.

Hot retentate gas stream 516 exits from the ion transport separator 512 and is then passed into combustor 520 to react with fuel gas stream 522 to produce reaction products gas stream 524 containing products of combustion PC1. Gas stream 524, being at the desired turbine inlet temperature, is injected into gas turbine 526 and expanded to produce power 559 to drive compressor 501, exhaust gas stream 528, and excess power 527. Exhaust gas stream 528 is passed into ion transport reactor 532 through open-ended heater tubes 530 and is heated to a temperature above the operating temperature of ion transport membrane 534, having a retentate side 534a and a permeate side 534b. The oxygen concentration of the turbine exhaust gas stream 528 will typically be in the 5 to 12% range, more than sufficient for the ion transport reactor function.

Heat needed to raise the temperature of exhaust gas stream 528 to a temperature at or above the required ion transport separator temperature is generated by the reaction of fuel gas stream 536, for example, methane, with oxygen permeating to the permeate side 534b of ion transport membrane 534, provided by pressure-driven oxygen ion transport across ion transport membrane 534. Typically ion transport membrane 534 will contain catalysts to enhance the reaction on the permeate side 534b of ion transport membrane 534 to produce gas stream 538 containing products of combustion PC2.

Optionally, products of combustion gas stream 538 is directed to merge with gas stream 516 which is introduced via stream 518 into combustor 520. The reaction side of ion transport reactor 532 preferably is operated in this construction at a pressure sufficiently high to permit adding the combustion gases PC2 to the retentate stream 516 flowing to combustor 520 and thereby avoid losing turbine flow mass and work potential. This process exploits one of the unique features of an ion transport reactor in that it can transfer the oxygen required for combustion from a low pressure stream to a high pressure stream as long as the reaction produces a ratio of partial oxygen pressures of retentate-to-permeate side greater than 1.

Optionally, all or a portion of gas stream 538 can be used to purge the permeate side of separator 512 to enhance oxygen transport. In this case, not shown, the exiting permeate stream would contain water and steam. After condensing out steam in cooler 554, a lower purity product containing 80 to 95% oxygen would be recovered. Excess hot permeate gas from gas stream 538 may be removed through optional hot permeate gas stream 539, cooled in heat exchanger 504 to produce cooled permeate gas stream 542.

Alternately, all or a portion of the combustion gases are withdrawn for the recovery of carbon dioxide as in FIG. 1 since the combustion gas's primary impurity will again be water. The design requirements for the ion transport reactor are similar to those of FIG. 1.

Hot retentate gas stream 544 exits ion transport reactor-separator 532 and, as mentioned above, provides the heat, and is itself cooled, in heat exchanger 508 to produce gas stream 546, which in turn is cooled in heat exchanger 504 to produce waste gas stream 558.

In yet another construction, a conventional in-line tail combustor or fired heater 560, FIG. 5B, is substituted for the ion transport reactor shown in FIG. 5A. As illustrated in FIG. 5B, turbine exhaust gas stream 528 is injected into the conventional in-line tail combustor or fired heater 560 and reacted with fuel gas stream 562 to produce gas stream 538. Either of the conventional in-line tail combustor or fired heater 560 offers independent temperature control and no dilution or decrease of oxygen concentration in the ion transport separator feed but, sacrifices the options of recycling products of combustion to the high temperature combustor inlet or recovery of a carbon dioxide-rich coproduct. Otherwise, this embodiment would function as described with regard to FIG. 5A.

The embodiments of FIGS. 5A and 5B enable independent control of turbine inlet and ion transport separator temperatures and do not expose the ion transport separator feed to dilution and contamination with products of combustion. Each has the additional advantage that the oxygen concentration in the ion transport separator feed and therefore the partial pressure driving force is not reduced as in the case of an in-line combustor or an in-line ion transport reactor upstream of a separator. The ion transport turbine-tail-gas reactor shares the advantage of easing control of fuel-to-oxygen equivalence ratios for stable combustion with the other ion transport reactor schemes.

Figure 6:
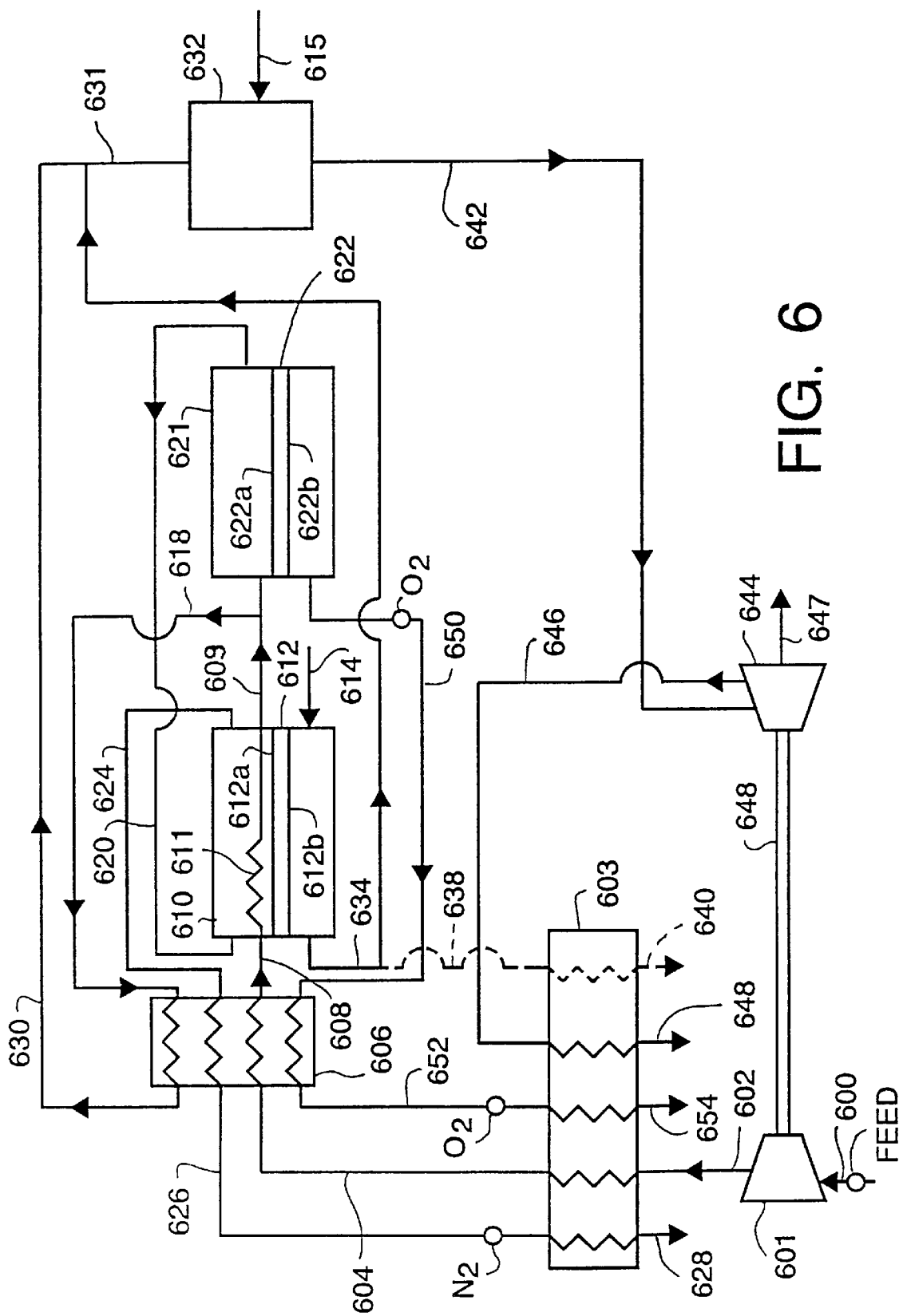
FIG. 6 is a schematic diagram of another embodiment of the invention using a solid electrolyte ionic conductor reactor-heater module as a-deoxo unit in combination with an ion transport separator module and a turbine to produce an oxygen product gas stream, a high purity product nitrogen stream, and power.

FIG. 6 illustrates a system to produce oxygen, nitrogen and carbon dioxide if desired, as coproducts with power generation. During operation feed gas stream 600 is compressed by compressor 601 to a pressure of 12 atm. Compressed gas stream 602 is heated to a temperature of 800 to 900° F. in recovery heat exchanger 603 by hot gas stream 652, turbine exhaust gas stream 646, hot gas stream 626 and optionally hot carbon dioxide gas stream 638, to produce heated gas stream 604. Heated gas stream 604 is further heated in heat exchanger 606 by heated gas stream 618, hot gas stream 624 and hot gas stream 650 to produce heated gas stream 608. Heated gas stream 608 is then heated to ion transport temperature in ion transport reactor-heater 610 as it passes through heater tubes 611. Heat needed to raise the temperature of gas stream 608 to the required ion transport separator temperature is generated by the reaction of fuel gas stream 614, for example, methane.

Heated gas stream 609 then exits ion transport reactor-separator 610 and is split; part of it becoming gas stream 618 which is passed through heat exchanger 606 and is then injected via stream to combustor 632, and part is injected into ion transport separator 621 where 50 to 75% of the contained oxygen is extracted as the gas is passed along ion transport membrane 622, having a retentate side 622a and a permeate side 622b.

Gas stream 650, as mentioned above, is cooled in heat exchanger 606 to produce gas stream 652, which, in turn, is cooled in heat exchanger 603 to produce oxygen gas stream 654. Retentate gas stream 620 is passed to ion transport reactor-heater 610 to provide the necessary oxygen for the reaction on the anode or permeate side 612b of the transport membrane 612 and at the same time strip the residual oxygen from the cathode side, or retentate side 612a of the transport membrane 612.

Retentate gas stream 624, as mentioned above, is cooled in heat exchanger 606 to produce gas stream 626, which, in turn, is cooled in heat exchanger 603 to produce nitrogen product stream 628 at system pressure. The nitrogen product stream preferably contains at least 95% nitrogen, more preferably at least 98% nitrogen, and most preferably more than 99% nitrogen, by volume. Less than 10 parts per million oxygen content is achievable. Permeate gas stream 634 is merged with gas stream 630 to form gas stream 631. Optionally, all or part of gas stream 634 can become gas stream 638. Gas stream 638 is cooled in heat exchanger 603 to produce gas stream 640, which is either discharged or from which $CO_2$ can be recovered by condensing out water.

Gas stream 631 is passed into combustor 632 to react with fuel gas stream 615 to produce reaction products gas stream 642. Gas stream 642, being at the desired turbine inlet temperature, typically 2400° F., is injected into gas turbine 644 to produce power 648 to drive compressor 601, exhaust gas stream 646, and excess power 647. Exhaust gas stream 646 is, as mentioned above, cooled against compressed gas stream 602 in heat exchanger 603 to produce waste gas stream 648.

The ion transport reactor 610 according to the embodiment of FIG. 6 performs essentially as a Deoxo unit. The proportioning of the split of the air stream 609 will depend on how much product one can extract without excessively penalizing the turbine 644. An adjustment in the nitrogen-to-oxygen product ratio can be achieved by returning some of the nitrogen stream to the combustor feed. As in some previous embodiments the products of reaction from the ion transport reactor can be mixed with the main feed stream to the combustor 632 or wholly or partially withdrawn as a carbon dioxide coproduct. The design of the ion transport reactor-heater 610 again has to manage removal of the heat of reaction in a way which will maintain the ion transport reactor elements at as uniform a temperature as possible.

It is evident the main advantage of the above arrangement is that it permits recovering a portion of the feed air stream 602, as nitrogen product and adjusting the nitrogen-to-oxygen product ratio over a wide range while retaining most of the advantages of the other embodiments of the invention.

In many smaller "low cost" gas turbines turbine inlet temperatures tend to be limited to the range of 1400° F. to 1800° F. (identical to the operating range of ion transport separators) to reduce capital costs. Obviously in these cases a separate high temperature combustor can be eliminated. The schemes shown in the previous figures, however, can still be employed with many of the previously cited advantages preserved.

Figure 7:
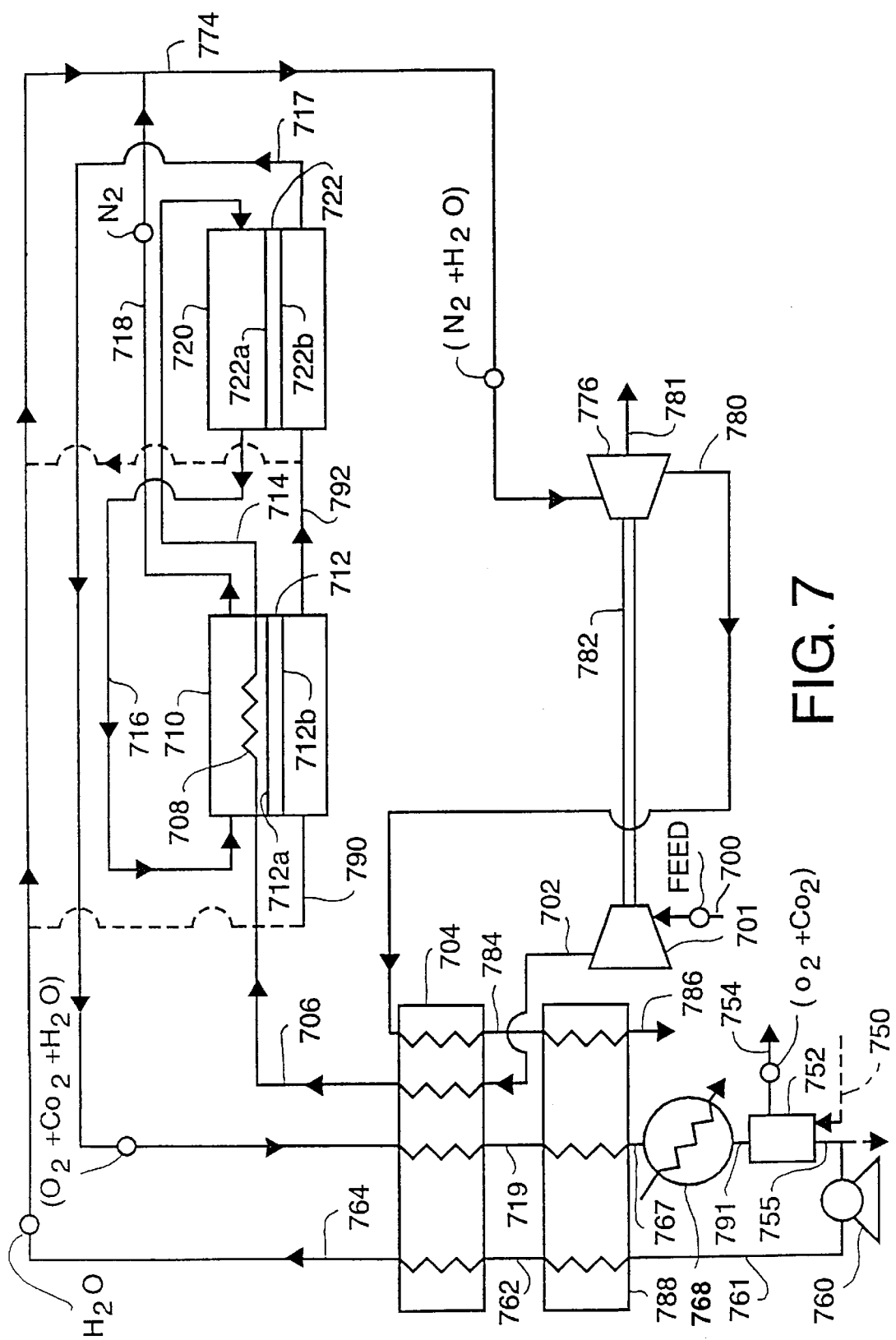
FIG. 7 is a schematic diagram of another embodiment of the invention using a solid electrolyte ionic conductor reactor-heater module in combination with an ion transport separator module and a turbine to produce an oxygen product gas stream and power wherein reaction products from the ion transport reactor anode or permeate side purge the permeate side of the ion transport separator to enhance oxygen ion transport.

FIG. 7 illustrates an embodiment applicable to smaller gas turbines featuring a more modest turbine inlet temperature of 1905° F. (1040° C.). In this case a second combustor is not required since the turbine inlet temperature is within the range of ion transport temperature requirements. In the particular example described below it is desired to recover a significant fraction of the contained oxygen and carbon dioxide as coproducts.

During operation feed gas stream 700 is compressed by compressor 701 to a pressure of 12 atm. Compressed gas stream 702 is heated to a temperature of 800 to 900° F. in recovery heat exchanger 704 by hot gas stream 780, hot gas stream 717, to produce heated gas stream 706. Heated gas stream 706 is then heated to ion transport temperature in ion transport reactor-separator 710 as it passes through heater tubes 708. Heat needed to raise the temperature of gas stream 706 to the required ion transport separator temperature is generated by the reaction of fuel gas stream 790, for example, methane.

Heated gas stream 706 then exits ion transport reactor-heater 710 as heated gas stream 714 and is injected into ion transport separator 720 where the gas is passed along ion transport membrane 722, having a retentate side 722*a* and a permeate side 722*b* and where oxygen is transferred from the retentate to the permeate side by ion transport. Retentate gas stream 716 is directed to ion transport reactor 710 where the gas is passed along ion transport membrane 712, having a retentate side 712*a* and a permeate side 712*b*, and where retentate gas stream 716 supplies the oxygen by ion transport required for the reaction on permeate side 712*b*. Retentate gas stream 718 is merged with gas stream 764 to form turbine inlet stream 774. Turbine inlet stream 774 is injected into gas turbine 776 to produce power 782 to drive compressor 701, and to produce exhaust gas stream 780, and excess power 781. Exhaust gas stream 780 is, as mentioned above, cooled against compressed gas stream 702 in heat exchanger 704 to produce gas stream 784, which is in turn cooled in heat exchanger 788 to produce nitrogen and water or water vapor gas stream 786.

Fuel stream 790 is introduced to the permeate side of ion transport 710 to react with the permeating oxygen and thereby provide the necessary heat. The exiting products of combustion 792 are used to purge the permeate side of ion transport separator 720 and thereby enhance oxygen transport by reducing the average partial oxygen pressure on the permeate side. Emerging permeate gas stream 717 now contains oxygen which is diluted substantially by steam and $CO_2$.

Stream 717 is cooled in heat exchanger 704 to produce gas stream 719, which, in turn, is cooled in heat exchanger 788 to produce stream 767. After condensing out water in condenser 768 the resulting water can be removed from stream 791 in separator 752 to produce water stream 755 and water saturated low purity oxygen product stream 754. If desired, the contained water can be removed in a dryer and $CO_2$ separated by a downstream process such as membranes or pressure or temperature swing adsorption such as illustrated by separator 464, FIG. 4. The $CO_2$ content of stream 754 will typically vary from 5 to 25%, depending on process conditions.

To utilize available waste heat and to minimize the loss of flow volume in the turbine, the separated water stream 755 preferably is pumped to the appropriate pressure by water pump 760, passes as stream 761 to the boiler-superheater pump 788 producing stream 762, which in turn is passed through recuperator heat exchanger 704 to produce stream 764. As mentioned above, stream 764 is mixed with the hot retentate stream 718 prior to being injected into the turbine inlet stream 774.

Depending on available heat and heat exchanger cost it is possible to add additional water at the suction of pump 760 through stream 750 to further reduce losses in volume flow and power in turbine 776. It is obvious that in lieu of separate ion transport units a combination reactor-separator can be employed. Also it is obvious that the general concept of using combustion gases from an ion transport reactor can be used with systems that employ a combustor downstream from the ion transport separator or the turbine.

Tables III and IV show how the embodiment of FIG. 7 can recover a significant fraction of the oxygen in the feed gas stream and provide an easily separable mixed oxygen-carbon dioxide product stream at little sacrifice in export power from the gas turbine.

TABLE III

Turbine without Coproducts

| | |
|---|---|
| Compressor Air Flow | 121,700 lbs/hr |
| Compressor compression ratio | 10:1 |
| Turbine inlet temperature | 1905° F. |
| Fuel flow rate | 2070 lbs/hr |
| Shaft power | 3580 kW |

TABLE IV

Turbine with Oxygen and Carbon Dioxide Coproducts

| | |
|---|---|
| Compressor air Flow | 121,700 lbs./hr |
| Compression ratio | 10:1 |
| Turbine inlet temperature | 1905° F. |
| Fuel Flow Rate | 2070 lbs/hr |
| Water addition | 5900 lbs/hr |
| Power produced | 3050 kW |
| Oxygen produced | 200 TPD (59 wt. % of oxygen in feed gas stream) |
| Carbon dioxide produced | 68TPD |

It can be seen that in the given example, 200 TPD of oxygen is produced at an effective power of 530 kW or 2.65 kW/TPD with no credit for carbon dioxide. The added capital will be that for the ion transport reactor-heater, the boiler superheater, the remainder of the water circuit, and a more elaborate recuperator with a credit for elimination of a combustor. An additional bonus will be the essentially complete elimination of $NO_x$ due to use of an ion transport reactor in lieu of a combustor.

It should be noted that the waste gas contains primarily water, nitrogen and oxygen and that in the example, the oxygen content as a percentage of non-condensible gases is only about 3%. As a result, the waste would make an ideal feed for a nitrogen product recovery system. A suitable system could be a membrane or PSA/TSA dryer followed by an ion transport Deoxo plant. In the case nitrogen is to be recovered the water condensed out of the waste could be used to reduce the external water supply to the system.

Elements required for the practice of the subject invention are appropriately designed ion transport reactors, reactor-heaters and reactor-separator units. As indicated earlier, the design of these devices must involve managing the heats of reaction in such a fashion that the temperature of the ion transport reactor elements do not experience excessive temperature excursions and operate at relatively uniform temperatures for maximum efficiency.

Typical ranges for operating parameters of the ion transport modules are as follows:

Temperature: For the ion transport modules, the temperature will typically be between 400° C. and 1500° C. range, and preferably between 600° C. and 1200° C. range. The steam turbine will typically operate between 350 and 600° C. range. The gas turbine will typically operate between 800° C. and 1500° C. range.

Pressure: The purge-side pressure will typically be between 1 atm and 40 atm, and preferably between 1 atm and 10 atm. The feed-side pressure will be between 1 atm and 40 atm if pressurized nitrogen is needed as a product or if the ion transport exhaust gas goes to a gas turbine for power generation, and 1 atm to 10 atm otherwise. Gas turbine inlet pressure will typically be between 5 atm and 40 atm, and the exhaust pressure will typically be between 1 atm and 1.5 atm. The steam generator will typically generate steam at a pressure of 10 atm to 50 atm for the Rankine cycle.

Oxygen Ion Conductivity of the Ion Transport Membrane: Typically in the 0.01–100 S/cm range (1 S=1/Ohm).

Thickness of the Ion Transport Membrane: Ion transport membrane can be employed in the form of a dense film, or a thin film supported on a porous substrate. The thickness (t) of the ion transport membrane/layer is typically less than 5000 microns, preferably it is less than 1000 microns, and most preferably it is less than 100 microns.

Configuration: The ion transport membrane elements may typically be tubular or planar.

As used herein the term "elemental oxygen" means any oxygen that is uncombined with any other element in the Periodic Table. While typically in diatomic form, elemental oxygen includes single oxygen atoms, triatomic ozone, and other forms uncombined with other elements.

Specific features of the invention are shown in one or more of the drawings for convenience only, as each feature may be combined with other features in accordance with the invention. In addition, various changes and modifications may be made to the examples given without departing from the spirit of the invention. Alternative embodiments will be recognized by those skilled in the art and they are intended to be included within the scope of the claims.

What is claimed is:

1. A process for producing at least an oxygen product gas stream and power, the process comprising:
   (a) compressing a feed gas stream containing elemental oxygen;
   (b) providing at least first and second ion transport membrane sections, each membrane section having a retentate zone on one side of the membrane section and a permeate zone on the other side;
   (c) heating the feed gas stream using heat generated by a reaction within the permeate zone of the first ion transport membrane section to produce a heated feed gas stream;
   (d) separating the heated feed gas stream using the second ion transport membrane section into an oxygen-depleted gas stream on the retentate side and an oxygen-containing gas stream on the permeate side;
   (e) extracting energy from at least one gas stream to be expanded, after that stream to be expanded has been heated directly or indirectly by the reaction within the first permeate zone, in a gas turbine to produce power; and
   (f) recovering the oxygen-containing gas stream as the oxygen product stream.

2. The process of claim 1 in which the first membrane section is a reactor membrane and the second membrane section is a different separator membrane spaced apart from the reactor membrane.

3. The process of claim 1 in which the first and second membrane sections are different portions of a unitary membrane structure.

4. The process of claim 1 in which the reaction within the permeate zone of the first ion transport membrane section includes reacting the oxygen permeating the first ion transport membrane section with a first fuel gas stream to produce a first combustion products gas stream.

5. The process of claim 4 further including obtaining carbon dioxide as a product from the first combustion products stream.

6. The process of claim 5 in which obtaining carbon dioxide includes removing water or water vapor from the first combustion products stream.

7. The process of claim 4 in which at least a portion of the combustion products stream is utilized to purge the permeate zone of the second ion transport membrane section to enhance oxygen ion transport through the second membrane section.

8. The process of claim 7 further including separating carbon dioxide from the oxygen-containing gas stream.

9. The process of claim 1, further including reacting the oxygen-depleted gas stream in a combustor with a second fuel gas stream to produce a second combustion products gas stream, and directing the second combustion products gas stream to the turbine as the gas stream to be expanded.

10. The process of claim 1, further including:
   combining at least a portion of the first combustion products gas stream with at least a portion of the oxygen-depleted gas stream from the retentate side of the ion transport separator membrane section to form an aggregate gas stream;
   reacting the aggregate gas stream in a combustor with a second fuel gas stream to produce a second combustion products gas stream; and directing the second combustion products gas stream to the turbine as the gas stream to be expanded.

11. The process of claim 1 in which the feed gas stream is heated within the retentate zone of the second ion transport membrane.

12. The process of claim 1 in which the retentate zone for the first and second membranes is the same zone.

13. The process of claim 1 in which the feed stream is heated within the retentate zone of the first membrane section.

14. The process of claim 1 in which at least a portion of the energy recovered by the gas turbine is used to accomplish the compression step.

15. The process of claim 1 in which at least a portion of the oxygen-depleted gas stream is recovered as a nitrogen product gas stream.

16. The process of claim 15 in which the feed stream is directed through the retentate zone of the first membrane section without intermixing with gases therein until after the heated feed gas stream has contacted the second ion transport membrane section.

17. The process of claim 16 in which the feed gas stream contains nitrogen and the first ion transport membrane section performs a deoxo function to remove additional oxygen from said nitrogen product gas stream.

18. The process of claim 1 in which the feed gas stream is heated by transferring heat within a heat exchanger, the heat being obtained from a gas stream heated within at least one of the retentate zone and the permeate zone of the first ion transport membrane section.

19. The process of claim 1 including reacting oxygen separated from an exhaust stream from the turbine with a fuel in the permeate zone of the first ion transport membrane section.

20. A process for producing at least an oxygen product gas stream and power, the process comprising:

(a) compressing a feed gas stream containing elemental oxygen;

(b) providing at least first and second ion transport membranes, each membrane having a retentate zone on one side of the membrane and a permeate zone on the other side and being spaced apart from the other membrane;

(c) heating the feed gas stream using heat generated by a reaction within the permeate zone of the first ion transport membrane to produce a heated feed gas stream including reacting the oxygen permeating the first ion transport membrane with a first fuel gas stream to produce a first combustion products gas stream;

(d) separating the heated feed gas stream using the second ion transport membrane into an oxygen-depleted gas stream on the retentate side and an oxygen-containing gas stream on the permeate side;

(e) reacting the oxygen-depleted gas stream in a combustor with a second fuel gas stream to produce a second combustion products gas stream;

(f) directing the second combustion products gas stream to a gas turbine;

(g) extracting energy from the second combustion products gas stream in the gas turbine to produce power; and (h) recovering the oxygen-containing gas stream as an oxygen product stream.

* * * * *